March 22, 1960     E. F. WANNER     2,929,505

FILTER BLOCKS

Filed April 4, 1958

INVENTOR.
Edwin F. Wanner
BY William B. Jaspert
Attorney

United States Patent Office 2,929,505
Patented Mar. 22, 1960

2,929,505

FILTER BLOCKS

Edwin F. Wanner, Pittsburgh, Pa., assignor to Natco Corporation, Pittsburgh, Pa., a corporation of Pennsylvania Application April 4, 1958, Serial No. 726,531

1 Claim. (Cl. 210—293)

This invention relates to new and useful improvements in filter blocks for use in filter beds, and it is among the objects thereof to provide a filter block especially for use in aerating the effluent channels of filter beds to provide maximum flow passage therethrough.

It is a further object of the invention to provide a filter block for filter beds having a central cross rib which is particularly useful as a grip for handling and laying up the filter tile.

The present application is a continuation-in-part of an application serially numbered 546,606 filed November 14, 1955, now abandoned.

Figure 1:
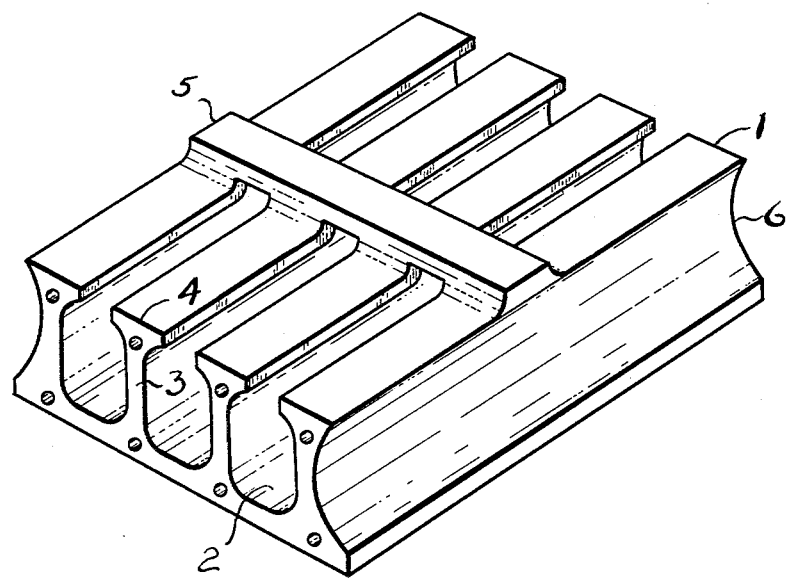
Figure 1 is a perspective view of a single filter block.

In the drawing, the numeral 1 generally designates a filter block or tile having flow channels 2 which constitute cells in the block that are divided by webs 3 terminating in rather wide flanges 4 that constitute supports for the coarse conglomerate of stone pebbles or other media of which the filter bed is constituted. A rib 5 extends at substantially the center of the filter block and forms a convenient grip or handle by which the tile can be laid, it being evident that the fingers may be inserted in the slots between the flanges 4 and the thumb on the opposite side of the ridge piece 5 to get a firm grasp of the filter block. The side faces of the block 1 are of concave shape, as shown at 6, so that when the tile is laid up to support the filter bed in the manner shown in Figure 2, adjacent side faces of the tile in adjacent rows form a flow passage designated by the numeral 7 in Figure 2. The tile are laid up in a manner to stagger the joints 8 and 9, thereby staggering the transverse gripping ribs 5. This staggered spacing of the ribs also aids in providing for uniform distribution of the filter bed conglomerate when it is placed on the assembled tile.

Figure 2:
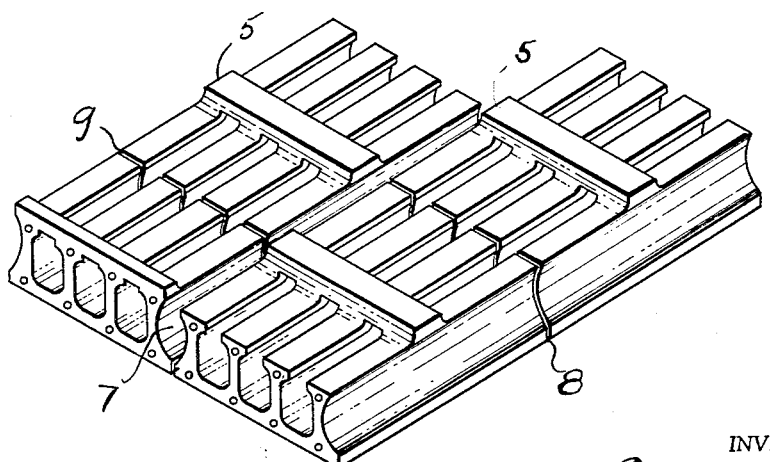
Figure 2 is a perspective view of several filter blocks placed adjacent to one another.

The bed of filter tile, as shown in Figure 2, provides for the ready flow of the effluent that trickles through the filter bed into the channels 2 in the assembled tile, and the spacing between the flanges 4 provides maximum aeration for the effluent.

Although one embodiment of the invention has been herein illustrated and described, it will be evident to those skilled in the art that various modifications may be made in the details of construction without departing from the principles herein set forth.

I claim:

A filter block for trickling filter beds having parallel rows of cells constituting effluent channels divided by vertical webs that terminate in wide top flanges, said filter blocks having a single rib extending across the top central portion midway between the ends of the blocks transversely of the flow channels constituting a reinforcing rib and a gripping member for handling the tile, the spacing between the flanges of said vertical webs from the transverse rib to the ends of the blocks forming aerating slots for the fluid flowing in the channels.

References Cited in the file of this patent

UNITED STATES PATENTS 2,161,999    Christie et al. _____ June 13, 1939